Patented Feb. 10, 1948

2,435,761

UNITED STATES PATENT OFFICE 2,435,761

ALKYLATION OF HYDROCARBONS

Carlisle M. Thacker, Highland Park, Ill., assignor to The Pure Oil Company, Chicago, Ill., a corporation of Ohio No Drawing. Application March 26, 1945, Serial No. 585,013

4 Claims. (Cl. 260—683.4)

This invention relates to alkylation of olefin hydrocarbons by means of paraffin hydrocarbons.

Alkylation of olefin hydrocarbons by means of paraffin and iso-paraffin hydrocarbons in the presence of hydrogen fluoride and boron trifluoride has been proposed in a number of patents and the use of anhydrous hydrogen fluoride as an alkylation catalyst has gone into some commercial use. Anhydrous hydrogen fluoride is used as an alkylation catalyst in the reaction of olefins with iso-paraffins at temperatures of approximately 30 to 120° F. under sufficient pressure to maintain the reaction mixture in liquid phase. An excess of iso-paraffins over olefins is maintained in the reaction mixture. This excess may range from a mole ratio of 2:1 to a mole ratio of 100:1 and in general, an olefin content in the reaction mixture of approximately 2 to 8% by weight when using butylenes gives good results. Contact times between the catalyst and reactants may range from fifteen minutes to several hours. The amount of anhydrous hydrogen fluoride in the reaction mixture may range from 10 to 60% of the total charge.

Where paraffins are used in the alkylation mixture instead of iso-paraffins, the reaction temperature is generally within the range of 150 to 350° F. and the reaction times are considerably longer than those required where iso-paraffins are used.

Not only is hydrogen fluoride a good catalyst for the reaction between olefins and normal or iso-paraffins, but it also catalyzes reaction between alkyl chlorides and iso-paraffins to form higher boiling branched-chain saturated hydrocarbons. This type of reaction may be carried out at temperatures of approximately 15° to 270° F. under pressure sufficient to maintain the reaction in liquid phase and with a high ratio of iso-paraffins to alkyl chloride of the order of 20 to 1.

Alkylation reactions between olefins and iso-paraffins may also be carried out in the presence of boron trifluoride as a catalyst. Boron trifluoride may be used in the presence of a small amount of hydrogen fluoride or may be used absorbed in water, phosphoric acid or in an organic acid such as formic or acetic acids. Boron trifluoride also may be used in the form of a product made by saturating aqueous hydrogen fluoride with boron trifluoride at room temperature. Using boron trifluoride as an alkylation catalyst, the reaction may be carried out at temperatures of the order of 30 to 120° F. under sufficient pressure to maintain the reaction mixture in liquid phase with an excess of iso-paraffins over olefin of approximately the same order as that used in connection with hydrogen fluoride alkylation. The catalyst may comprise 5 to 50% of the reaction mixture and the reaction time may range over a period of approximately five minutes to three or four hours.

The use of hydrogen fluoride as an alkylation catalyst is disclosed in Patent No. 2,325,052 and Patent No. 2,317,901. The use of hydrogen fluoride in the alkylation of iso-paraffins with alkyl chlorides is disclosed in Patent No. 2,307,799. The alkylation using boron trifluoride in saturated water solution is disclosed in Patent No. 2,363,166. Use of boron trifluoride absorbed in phosphoric acid is disclosed in Patent No. 2,363,622. The use of boron trifluoride absorbed in organic acids is disclosed in Patent No. 2,311,531. The use of boron trifluoride in aqueous hydrogen fluoride saturated with boron trifluoride at room temperature is disclosed in Patent No. 2,296,371.

I have discovered that alkylation reactions in which hydrogen fluoride, boron trifluoride or combination thereof, or catalysts in which either hydrogen fluoride or boron trifluoride is the active constituent, are promoted by using, in conjunction with the hydrogen fluoride and/or boron trifluoride catalyst, a small amount of bromine and/or chlorine. In the presence of a small amount of bromine and/or chlorine, the alkylation reaction proceeds more rapidly resulting in a higher conversion to desired alkylation products in a given period of time. Bromine and/or chlorine is added to the reaction mixture in amounts not less than .25 and not over 10% by weight of the hydrocarbons charged. Where chlorine is used as the promoter, I prefer to use from 1 to 5% by weight of chlorine based on the hydrocarbons, and where bromine is used as the promoter, the amount of bromine may vary from .25 to 10% by weight of the hydrocarbon charged. In all other respects, the alkylation process is carried out under the time, temperature and pressure conditions disclosed above in connection with boron trifluoride and hydrogen fluoride catalysis and recited in the aforesaid patents.

As an example of the invention, feed stock containing iso-butane and butylenes in a mole ratio of 5 to 1 is charged to a reaction vessel where it is mixed with approximately an equal volume of anhydrous hydrogen fluoride and about 1% by weight of chlorine based on the hydrocarbons charged. The mixture is reacted for a period of about twenty minutes at a temperature of approximately 100° F. under a pressure of approximately 200 pounds per square inch which is sufficient to maintain the charge in liquid state. The reaction mixture is separated in the conventional manner to obtain the liquid alkylate acid and recycle stock. The liquid alkylate is principally a product composed of only branched-chain hydrocarbons of high octane number suitable for the aviation blending stock. The amount of alkylate obtained is greater than the amount obtainable without the chlorine under the same reaction conditions.

Although the invention is applicable to the reaction of paraffins and olefins or alkyl chlorides generally, it is particularly applicable to the reaction of paraffinic hydrocarbons containing from 4 to 7 carbon atoms per molecule and olefinic hydrocarbons containing 4 or 5 carbon atoms per molecule.

It is claimed:

1. The method of alkylating paraffin hydrocarbons by means of a compound selected from the group of olefins and alkyl chlorides comprising, contacting said paraffin hydrocarbons and said compound under alkylating conditions of time, temperature and pressure in the presence of boron trifluoride and a promoter selected from the group consisting of chlorine and bromine.

2. The method of alkylating paraffin hydrocarbons by means of a compound selected from the group of olefins and alkyl chlorides comprising, contacting said paraffin hydrocarbons and said compounds under alkylating conditions of time, temperature and pressure in the presence of boron trifluoride as a catalyst and chlorine as a promoter.

3. The method of alkylating paraffin hydrocarbons by means of a compound selected from the group of olefins and alkyl chlorides comprising, contacting said paraffin hydrocarbons and said compound under alkylating conditions of time, temperature and pressure in the presence of boron trifluoride as a catalyst and bromine as a promoter.

4. The method of reacting paraffinic hydrocarbons containing 4 to 7 carbon atoms per molecule with olefinic hydrocarbons containing 4 and 5 carbon atoms per molecule comprising, contacting said hydrocarbons in a molar ratio of 2 to 100 moles of paraffinic hydrocarbons to 1 mole of olefinic hydrocarbon under suitable time, temperature and pressure conditions in liquid phase with a catalyst comprising boron trifluoride and a promoter selected from the group consisting of bromine and chlorine, the promoter being present in amounts of approximately 0.25 to 10 per cent by weight of the hydrocarbons.

CARLISLE M. THACKER.

REFERENCES CITED

The following references are of record in the file of this patent:

UNITED STATES PATENTS

| Number | Name | Date |
| --- | --- | --- |
| 2,196,831 | Hull et al. | Apr. 9, 1940 |
| 2,318,765 | Egloff | May 11, 1943 |
| 2,408,329 | Meadow | Sept. 24, 1946 |